United States Patent
Leaper et al.

(10) Patent No.: US 12,234,018 B2
(45) Date of Patent: Feb. 25, 2025

(54) ENVIRONMENTAL CONTROL SYSTEM WITH NO BLEED DRIVEN THROTTLE

(71) Applicant: Hamilton Sundstrand Corporation, Charlotte, NC (US)

(72) Inventors: Gregory R. Leaper, South Windsor, CT (US); Jeffrey Ernst, Wethersfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/830,002

(22) Filed: Jun. 1, 2022

(65) Prior Publication Data
US 2023/0391459 A1 Dec. 7, 2023

(51) Int. Cl.
*B64D 13/06* (2006.01)

(52) U.S. Cl.
CPC ...... *B64D 13/06* (2013.01); *B64D 2013/0618* (2013.01); *B64D 2013/0644* (2013.01); *B64D 2013/0648* (2013.01)

(58) Field of Classification Search
CPC ........ B64D 13/08; B64D 13/06; B64D 13/02; B64D 13/006; B64D 2013/0618; B64D 2013/0688; B64D 2013/0611; B64D 2013/064; B64D 2013/0644; B64D 2013/0655; B64D 2221/00; B64D 33/02; B64D 33/04; F02C 6/08
See application file for complete search history.

(56) References Cited

U.S. PATENT DOCUMENTS

| | | | |
|---|---|---|---|
| 5,704,218 A | 1/1998 | Christians et al. | |
| 6,988,376 B2 | 1/2006 | Brutscher et al. | |
| 7,467,524 B2 | 12/2008 | Brutscher et al. | |
| 7,970,497 B2 | 6/2011 | Derouineau et al. | |
| 8,365,550 B2 | 2/2013 | Voegel | |
| 9,598,175 B2 * | 3/2017 | DeValve | F25B 11/00 |
| 9,964,036 B2 | 5/2018 | Schwarz et al. | |
| 10,457,399 B2 * | 10/2019 | Bammann | B64D 13/06 |
| 10,954,865 B2 | 3/2021 | Mackin | |
| 2001/0025507 A1 * | 10/2001 | Buchholz | B64D 13/06 62/402 |
| 2002/0088245 A1 * | 7/2002 | Sauterleute | B64D 13/06 62/304 |
| 2004/0172963 A1 * | 9/2004 | Axe | B64D 13/06 62/88 |

(Continued)

OTHER PUBLICATIONS

Extended European Search Report for European Application No. 23176676.7; Report Mail Date Oct. 18, 2023 (11 Pages).

*Primary Examiner* — Gordon A Jones
(74) *Attorney, Agent, or Firm* — CANTOR COLBURN LLP

(57) ABSTRACT

An environmental control system of a vehicle includes a first inlet for receiving a first medium, a second inlet for receiving a second medium, and an outlet for delivering a conditioned medium to a load. A first compression device is configured to receive and compress the first medium and a second compression device is configured to receive and compress the second medium. The first medium and the second medium are mixed together at a mixing point such that a mixture of the first medium and the second medium is the conditioned medium provided at the outlet.

12 Claims, 1 Drawing Sheet

(56) References Cited

U.S. PATENT DOCUMENTS

| | | |
|---|---|---|
| 2004/0177639 A1* | 9/2004 | Army, Jr. ............... B64D 13/08 |
| | | 62/402 |
| 2007/0113579 A1 | 5/2007 | Claeys et al. |
| 2009/0084896 A1* | 4/2009 | Boucher ............... B64D 13/08 |
| | | 454/76 |
| 2013/0040545 A1 | 2/2013 | Finney |
| 2013/0061611 A1 | 3/2013 | Dittmar et al. |
| 2017/0305559 A1 | 10/2017 | Bruno et al. |
| 2018/0066586 A1* | 3/2018 | Brostmeyer ............. F02C 3/06 |
| 2018/0305030 A1* | 10/2018 | Galzin .................. B64D 13/06 |
| 2018/0331599 A1 | 11/2018 | Parlante |
| 2019/0291875 A1 | 9/2019 | Behrens et al. |

\* cited by examiner

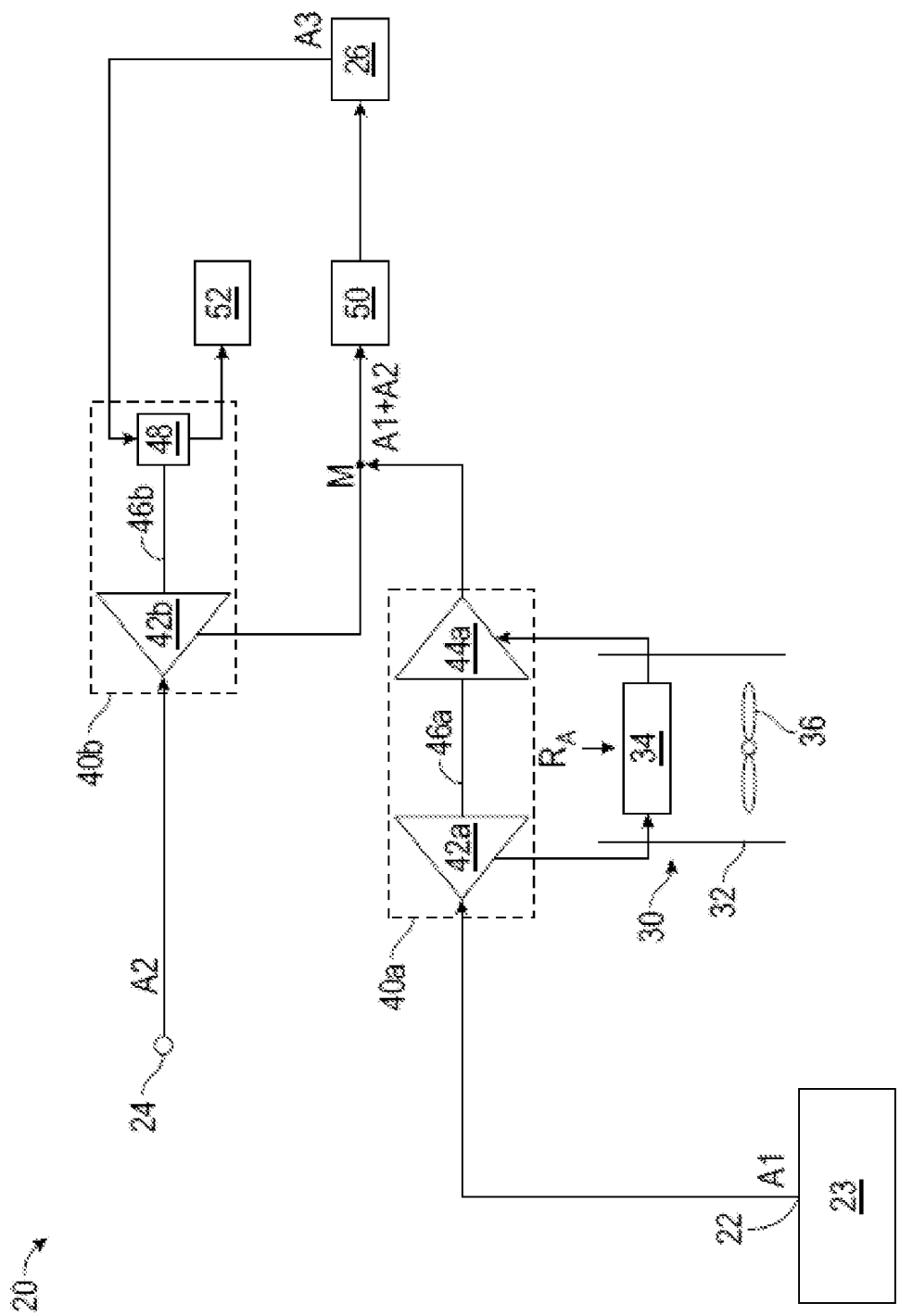

ENVIRONMENTAL CONTROL SYSTEM WITH NO BLEED DRIVEN THROTTLE

BACKGROUND

Exemplary embodiments pertain to the art of environmental control systems, and more particularly, to an environmental control system of an aircraft.

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin. Unfortunately, each of these approaches provides limited efficiency with respect to engine fuel burn.

BRIEF DESCRIPTION

According to an embodiment, an environmental control system of a vehicle includes a first inlet for receiving a first medium, a second inlet for receiving a second medium, and an outlet for delivering a conditioned medium to a load. A first compression device is configured to receive and compress the first medium and a second compression device is configured to receive and compress the second medium. The first medium and the second medium are mixed together at a mixing point such that a mixture of the first medium and the second medium is the conditioned medium provided at the outlet.

In addition to one or more of the features described herein, or as an alternative, in further embodiments the first compression device is a two-wheel air cycle machine.

In addition to one or more of the features described herein, or as an alternative, in further embodiments the first compression device further comprises a compressor and a turbine operably coupled by a shaft, wherein the first medium is received by both the compressor and the turbine.

In addition to one or more of the features described herein, or as an alternative, in further embodiments the first medium is received by the compressor and the turbine in series.

In addition to one or more of the features described herein, or as an alternative, in further embodiments comprising a ram air circuit having a ram air heat exchanger, the ram air heat exchanger being arranged downstream from the compressor and upstream from the turbine relative to a flow of the first medium.

In addition to one or more of the features described herein, or as an alternative, in further embodiments comprising a fan operable to move a flow of ram air through the ram air circuit. The fan is located remotely from the first compression device and the second compression device.

In addition to one or more of the features described herein, or as an alternative, in further embodiments the mixing point is located at or downstream from both the first compression device and the second compression device.

In addition to one or more of the features described herein, or as an alternative, in further embodiments comprising a water separator arranged upstream from the outlet and downstream from the mixing point relative to a flow of the conditioned medium.

In addition to one or more of the features described herein, or as an alternative, in further embodiments the second compression device further comprises a compressor and an electric motor operably coupled to the compressor.

In addition to one or more of the features described herein, or as an alternative, in further embodiments a third medium is operable to remove heat from one or more electronics of the electric motor.

In addition to one or more of the features described herein, or as an alternative, in further embodiments the third medium is cabin discharge air.

In addition to one or more of the features described herein, or as an alternative, in further embodiments the first medium is bleed air.

In addition to one or more of the features described herein, or as an alternative, in further embodiments the second medium is fresh air.

In addition to one or more of the features described herein, or as an alternative, in further embodiments the vehicle is an aircraft.

According to an embodiment, a method of operating an environmental control system includes conditioning a first medium via a first compression device, conditioning a second medium via a second compression device, after the conditioning, mixing the first medium and the second medium to form a mixture of the first medium and the second medium and removing water from the mixture of the first medium and the second medium.

In addition to one or more of the features described herein, or as an alternative, in further embodiments conditioning the first medium further comprises compressing the first medium via a compressor of the first compression device, cooling the first medium within a heat exchanger arranged downstream from an outlet of the compressor, and extracting work from the first medium within a turbine.

In addition to one or more of the features described herein, or as an alternative, in further embodiments the turbine is operably coupled to the compressor of the first compression device by a shaft and work extracted from the first medium within the turbine is used to drive the compressor of the first compression device.

In addition to one or more of the features described herein, or as an alternative, in further embodiments cooling the first medium within the heat exchanger further comprises moving a flow of ram air over the heat exchanger via a fan.

In addition to one or more of the features described herein, or as an alternative, in further embodiments conditioning the second medium further comprises compressing the second medium via a compressor of the second compression device.

In addition to one or more of the features described herein, or as an alternative, in further embodiments the second compression device further comprises an electric motor operably coupled to the compressor, the method further comprising cooling the electric motor via a flow of a third medium.

BRIEF DESCRIPTION OF THE DRAWINGS

The following descriptions should not be considered limiting in any way. With reference to the accompanying drawings, like elements are numbered alike:

The FIGURE is a schematic diagram of an environmental control system according to an embodiment.

DETAILED DESCRIPTION

A detailed description of one or more embodiments of the disclosed apparatus and method are presented herein by way of exemplification and not limitation with reference to the FIGURES.

Embodiments herein provide an environmental control system of an aircraft that uses mediums from different sources to power the environmental control system and to provide cabin pressurization and cooling at a high fuel burn efficiency. The medium can generally be air, while other examples include gases, liquids, fluidized solids, or slurries.

With reference now to the FIGURE, an example of a schematic diagram of a portion of an environment control system (ECS) 20, such as an air conditioning unit or pack for example, is depicted according to a non-limiting embodiment. Although the environmental control system 20 is described with reference to an aircraft, alternative applications, such as another vehicle for example, are also within the scope of the disclosure. As shown, the ECS 20 may be configured to receive a first medium A1 at a first inlet 22. In embodiments where the ECS 20 is used in an aircraft application, the first medium A1 is bleed air, which is pressurized air originating from, i.e., being "bled" from, an engine or auxiliary power unit, illustrated schematically at 23, of the aircraft. It shall be understood that one or more of the temperature, humidity, and pressure of the bleed air can vary based upon the compressor stage and revolutions per minute of the engine or auxiliary power unit from which the air is drawn.

The ECS 20 may alternatively or additionally be configured to receive a second medium A2 at a second inlet 24 and may be configured to provide a conditioned form of one or both of the first medium A1 and the second medium A2 to a volume 26 via an outlet of the ECS 20. In an embodiment, the second medium A2 is fresh air, such as outside air for example. The outside air can be procured via one or more scooping mechanisms, such as an impact scoop or a flush scoop for example. Thus, the second inlet 24 can be considered a fresh or outside air inlet. In an embodiment, the second medium A2 is ram air drawn from a portion of a ram air circuit to be described in more detail below. Generally, the second medium A2 described herein is at an ambient pressure equal to an air pressure outside of the aircraft when the aircraft is on the ground and is between an ambient pressure and a cabin pressure when the aircraft is in flight.

The ECS 20 may be configured to receive a third medium A3 at a third inlet 28. In an embodiment, an outlet of the ECS 20 is operably coupled to a volume, such as the cabin of an aircraft, and the third medium A3 is cabin discharge air, which is air leaving the volume 26 and that would typically be discharged overboard.

As shown, the ECS 20 may include a ram air circuit 30 including a shell or duct 32 within which one or more heat exchangers are located. The ram air duct 32 can receive and direct a medium, such as ram air $R_A$ for example, through a portion of the ECS 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the ram air duct 32 may be referred to as ram heat exchangers. In the illustrated, non-limiting embodiment, the at least one ram heat exchanger includes a single heat exchanger 34. However, embodiments including more than one heat exchanger 34 are also within the scope of the disclosure. Within the heat exchanger 34 ram air $R_A$, such as outside air for example, acts as a heat sink to cool a medium passing there through, for example the first medium A1 and/or the second medium A2.

As shown, a fan 36 is arranged in fluid communication with the ram air $R_A$, within the ram air duct 32. A fan 36 is a mechanical device that can force via push or pull methods air through the shell 32 of the ram air duct, across at least a portion of the ram air heat exchangers 34. In the illustrated embodiment, the fan 36 is a separate component, for example driven by an electrical power source (not shown). However, embodiments where the fan 36 is a component of a compression device, to be described in mode detail below, are also contemplated herein.

The ECS 20 additionally includes at least one compression device, and in some embodiments includes a plurality of compression devices. Each compression device is a mechanical device that includes components for performing thermodynamic work on a medium (e.g., extracts work from or applies work to the first medium A1 or the second medium A2 by raising and/or lowering pressure and by raising and/or lowering temperature). Examples of a compression device include an air cycle machine, a two-wheel air cycle machine, a three-wheel air cycle machine, a four-wheel air cycle machine, etc.

In the illustrated, non-limiting embodiments, the ECS 20 includes a separate and distinct first compression device 40a and second compression device In the illustrated, non-limiting embodiment, each of the first compression device and the second compression device 40b is associated with a respective flow of either the first medium A1 or the second medium A2. Accordingly, the first and second compression devices may be considered arranged in parallel.

In an embodiment, the first compression device 40a is a simple cycle or two-wheel machine. As shown, the first compression device 40a includes a compressor 42a and a turbine 44a operably coupled by a shaft 46a. A compressor, such as compressor 42a, is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. A turbine, such as any of turbines 44a for example, is a mechanical device that expands a medium and extracts work therefrom (also referred to as extracting energy) to drive the compressor 42 via the shaft 46.

In the illustrated, non-limiting embodiment, the second compression device 40b includes a compressor 42b. An electric motor 48 may be operably coupled to the compressor 42b via a shaft 46b. Accordingly, the motor 48 is operable to drive rotation of the compressor 42b. However, embodiments where the second compression device 40b includes another component suitable to drive the compressor 42b via the shaft 46b are also within the scope of the disclosure.

The elements of the ECS 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the ECS 20 can be regulated to a desired value.

During operation of the ECS 20, the first medium A1 and the second medium A2 are simultaneously conditioned by the first and second compression devices 40a, 40b. As shown, the first medium A1 is provided to the first inlet 22 and the second medium A2 is provided to the second inlet 24. The first medium A1 received at the first inlet 22 from a source 23, is provided to an inlet of the compressor 42a of the first compression device 40a. The act of compressing the first medium A1, heats and increases the pressure of the first medium A1. From the outlet of the compressor 42a, the heated first medium A1 is provided to the ram air circuit 30, and specifically to the ram air heat exchanger 34. Within the ram air heat exchanger 34, the first medium A1 is cooled by a flow of ram air RA drawn through the ram air duct 32 and across the heat exchanger 34 by the fan 36. The heated ram air $R_A$ may be exhausted overboard, or alternatively, may be provided to another load of the aircraft.

The cooled first medium output from the ram air heat exchanger is then delivered to an inlet of the turbine 44a of the first compression device 40a. Within the turbine 44a, the high pressure first medium A1 is expanded and work is extracted therefrom. As previously noted, the work extracted from the first medium A1 is used to drive the compressor 42a via the shaft 46a. The conditioned form of the first medium A1 output from the turbine 44a has a reduced temperature and pressure relative to the first medium A1 provided to the inlet of the turbine 44a.

From the second inlet 24, the second medium A2 is provided to the inlet of the second compressor 42b. The act of compressing the second medium A2, heats the second medium A2. The conditioned form (i.e., compressed) of the second medium A2 provided at the outlet of the compressor 42b of the second compression device 40b is then mixed at a mixing point labeled M with the conditioned formed of the first medium A1 output from the turbine 44a of the first compression device 40a. The mixing point M is located at or downstream from an outlet of both the compressor 42b and the turbine 44a. In the illustrated, non-limiting embodiment, the mixing point is located downstream from the outlet of both the compressor 42b and the turbine 44a.

Arranged downstream, for example directly downstream, from the mixing point M is a water separator 50 configured to facilitate the formation of condensation and the removal of such condensation from the medium provided thereto. Accordingly, when the mixture of the first medium A1 and the second medium A2 is provided to the water separator 50, any free fluid entrained within the mixture is removed therefrom. The conditioned medium of the dry mixture of the first medium A1 and the second medium A2 output from the water separator 50 may then be delivered to one or more loads of the aircraft, including to volume 26.

A flow of the third medium A3, may be provided to a component of the second compression device 40b. In an embodiment, the flow of third medium A3 is provided to the motor 48 to cool the motor. The third medium A3 may be configured to make a single pass, or alternatively, a plurality of passes about an exterior of and/or through a housing of the motor 48. Because a temperature of the third medium A3 is cooler than the one or more electronics of the motor 48, heat is transferred from the motor 48 and its electronics to the third medium A3. After having removed heat from the motor 48, the third medium A3 may then be delivered to another system of load of the aircraft, represented schematically at 52. In an embodiment, the heated third medium A3 is used to perform thrust recovery, or alternatively, to perform a trim operation.

The environmental control system 20 illustrated and described herein eliminates the need to throttle or control the flow of the first medium A1 from an engine or auxiliary power unit. The system additionally allows for the use of an unregulated compressor. As a result, the complexity and cost of such an environmental control system 20 is reduced compared to existing systems.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system of a vehicle comprising:
    a first inlet for receiving a first medium provided from a first source;
    a second inlet for receiving a second medium provided from a second source, the second source being different from the first source;
    an outlet for delivering a conditioned medium to a load;
    a first compression device including a compressor configured to receive and compress the first medium and a turbine configured to receive and extract energy from the first medium, the compressor and the turbine being operably coupled by a shaft; and
    a second compression device configured to receive and compress the second medium;
    wherein the first medium at a location downstream from the turbine and the second medium are mixed together at a mixing point such that a mixture of the first medium and the second medium is the conditioned medium provided at the outlet; and
    a water separator arranged upstream from the outlet and downstream from the mixing point relative to a flow of the conditioned medium.

2. The environmental control system of claim 1, wherein the first compression device is a two-wheel air cycle machine.

3. The environmental control system of claim 1, wherein the first medium is received by the compressor and the turbine in series.

4. The environmental control system of claim 1, further comprising a ram air circuit having a ram air heat exchanger, the ram air heat exchanger being arranged downstream from the compressor and upstream from the turbine relative to a flow of the first medium.

5. The environmental control system of claim 4, further comprising a fan operable to move a flow of ram air through the ram air circuit, the fan being located remotely from the first compression device and the second compression device.

6. The environmental control system of claim 1, wherein the mixing point is located at or downstream from both the first compression device and the second compression device.

7. The environmental control system of claim 1, wherein the second compression device further comprises a compressor and an electric motor operably coupled to the compressor.

8. The environmental control system of claim 7, wherein a third medium is operable to remove heat from one or more electronics of the electric motor.

9. The environmental control system of claim 8, wherein the third medium is cabin discharge air.

10. The environmental control system of claim 1, wherein the first medium is bleed air.

11. The environmental control system of claim 1, wherein the second medium is fresh air.

12. The environmental control system of claim 1, wherein the vehicle is an aircraft.

* * * * *